US011881655B2

(12) United States Patent
Hsieh

(10) Patent No.: US 11,881,655 B2
(45) Date of Patent: Jan. 23, 2024

(54) ELECTRICAL CONNECTOR

(71) Applicant: BizConn International Corp., Guangdong (CN)

(72) Inventor: Chin-An Hsieh, Taoyuan (TW)

(73) Assignee: BizConn International Corp., Guangdong (CN)

( * ) Notice: Subject to any disclaimer, the term of this patent is extended or adjusted under 35 U.S.C. 154(b) by 127 days.

(21) Appl. No.: 17/644,564

(22) Filed: Dec. 16, 2021

(65) Prior Publication Data

US 2022/0209465 A1 Jun. 30, 2022

(30) Foreign Application Priority Data

Dec. 24, 2020 (CN) ......................... 202023164150.6

(51) Int. Cl.

*H01R 13/646* (2011.01)
*H01R 13/6461* (2011.01)
*H01R 24/60* (2011.01)
*H01R 12/71* (2011.01)

(52) U.S. Cl.

CPC ....... *H01R 13/6461* (2013.01); *H01R 12/716* (2013.01); *H01R 24/60* (2013.01)

(58) Field of Classification Search

None
See application file for complete search history.

(56) References Cited

U.S. PATENT DOCUMENTS

| | | | | |
|---|---|---|---|---|
| 9,431,781 | B2 * | 8/2016 | Kuang | H01R 13/6586 |
| 9,627,825 | B2 * | 4/2017 | Leng | H01R 13/6581 |
| 2013/0330976 | A1 * | 12/2013 | Simmel | H01R 24/60 439/660 |
| 2020/0313331 | A1 * | 10/2020 | Oosaka | H01R 13/6583 |
| 2023/0163502 | A1 * | 5/2023 | Lau | H01R 12/7011 439/495 |

* cited by examiner

*Primary Examiner* — James Harvey
(74) *Attorney, Agent, or Firm* — Charney IP Law LLC; Thomas M. Finetti

(57) ABSTRACT

The present disclosure discloses an electrical connector including a conductive casing, a wire-end casing arranged inside the conductive casing, and a wire-end plastic body arranged inside the wire-end casing; and a terminal module including an upper terminal set (71) and a lower terminal set (73) is arranged inside the wire-end plastic body; a molding piece is arranged inside the conductive casing; and a printed circuit board is provided at the bottom of the molding piece; a terminal module is arranged in the molding piece; the terminal module includes an upper terminal set (71), a lower terminal set (73) and a partition plate therebetween, and grounding arms are arranged on the partition plate.

18 Claims, 6 Drawing Sheets

ELECTRICAL CONNECTOR

TECHNICAL FIELD

The present disclosure relates to the technical field of an electrical connector and specifically provides a novel electrical connector.

BACKGROUND ART

Electrical connectors are mainly used for electric connection and signal transmission among devices, components, and systems. They are basic elements necessary to form a complete system. When signal transmission is getting faster and faster, under the shielding of two layers of terminals, mutual crosstalk interference is easily caused, which affects the high-frequency performance of a product and cannot well meet the high-speed transmission requirements of the electrical connectors, so this needs to be improved.

SUMMARY

To overcome the shortcomings of the existing art, the present disclosure provides a novel electrical connector that has the advantages of transmitting noise such as crosstalk and meeting a high-speed transmission need.

The technical solution used by the present disclosure to solve the technical problems is as follows:

A novel electrical connector includes a conductive casing; a wire-end casing is arranged inside the conductive casing; a molding piece is arranged inside the conductive casing; a printed circuit board (PCB) is provided at the bottom of the molding piece; a terminal module is arranged in the molding piece; the terminal module includes an upper terminal set and a lower terminal set; a partition plate is arranged between the upper terminal set and the lower terminal set; grounding arms are arranged on the left and right sides of the partition plate at the protruding end of the partition plate; the grounding arms are in touch connection with the wire-end casing, and the wire-end casing is in touch connection with the conductive casing for transmitting crosstalk and other noise to the GND.

In the novel electrical connector of the present disclosure, several resisting blocks are arranged on an inner wall at the top of the conductive casing; stop slots are formed at the top of the molding piece; the stop slot limits the resisting blocks, to limit the movement of the molding piece; and a first molding piece is mounted on the back of the conductive casing and is used for covering the molding piece. This structural arrangement is used for insulating the conductive casing from electricity.

In the novel electrical connector of the present disclosure, two first grooves are formed in the inner wall of the molding piece; the molding piece is provided with two terminal plates longitudinally extending away from the first groove; an end wall is arranged between the two terminal plates to form a chamber; when the terminal module is plugged into the molding piece, the partition plate of the terminal module is plugged into the chamber. This structural arrangement is used for isolating the upper terminal set from the lower terminal set to prevent mutual crosstalk interference in the terminal module.

In the novel electrical connector of the present disclosure, several second grooves are formed in the upper terminal set; several through holes are formed in the partition plate; the lower terminal set is fixedly connected with several connection pillars at its top; and the several connection pillars run through the through holes and are plugged into the second grooves to limit the position of the partition plate. This structural arrangement shortens a distance from the position where the partition plate contacts the wire-end casing to the terminal module.

In the novel electrical connector of the present disclosure, the conductive casing is fixedly connected with several first stop plates on the outer side; and the several first stop plates extend towards the internal of the conductive casing to contact the wire-end casing. This structural arrangement is used for limiting the movement of the wire-end casing so that the wire-end casing is not easy to fall off, and the crosstalk and other noise from the wire-end casing can be transmitted.

In the novel electrical connector of the present disclosure, a wire-end plastic body is mounted inside the wire-end casing; and several second stop plates are provided on the top of the wire-end casing at its protruding end, and the second stop plates extend towards the internal of the wire-end casing to limit the movement of the wire-end plastic body. This structural arrangement enables the wire-end plastic body to be stably placed at the desired position and prevents undesired sliding.

In the novel electrical connector of the present disclosure, a terminal set module is arranged inside the wire-end plastic body; and the terminal set module includes an upper terminal set module and a lower terminal set module. This structural arrangement is used for realizing the functions of the electrical connector.

The present disclosure has the following beneficial effects.

In the present disclosure, the lower terminal set is fixedly connected with the several connection pillars at its top and is connected to the partition plate and the upper terminal set via the connection pillars, this structural arrangement can limit the position of the partition plate, which shortens the distance from the position where the partition plate contacts the wire-end casing to the terminal module;

In the present disclosure, the chamber is provided on the molding piece, and the partition plate of the terminal module is plugged in the chamber, this structural arrangement can isolate the upper terminal set from the lower terminal set in the terminal module to prevent the mutual crosstalk interference between the upper terminal set and the lower terminal set;

In the present disclosure, the grounding arms are arranged on the left and right sides of the partition plate, and the grounding arms are in touch connection with the conductive wire-end casing, the partition plate connects to the wire-end casing so that the wire-end casing transmits the crosstalk between the upper terminal set and the lower terminal set to the next structure, to transmit the crosstalk and other noise to the GND.

DESCRIPTION OF DRAWINGS

The present disclosure is further described below in detail in combination with the accompanying drawings and embodiments.

Figure 1:
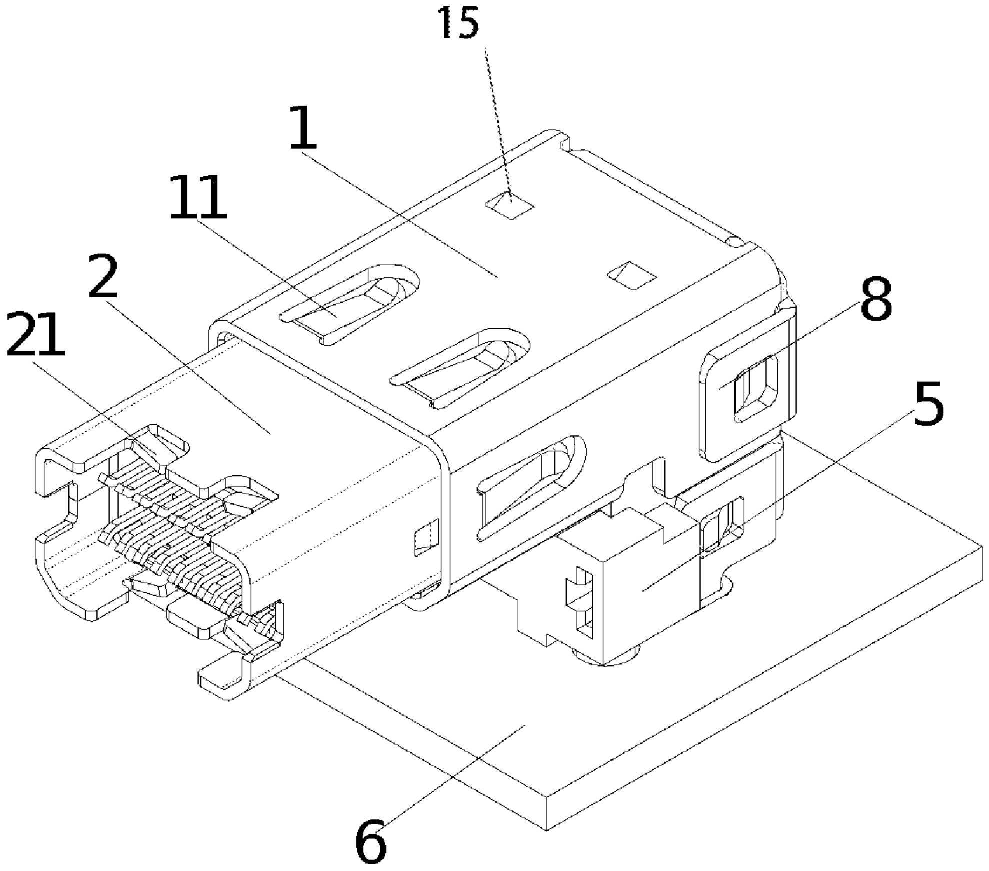
FIG. 1 is a schematic structural diagram of the present disclosure.
Figure 2:
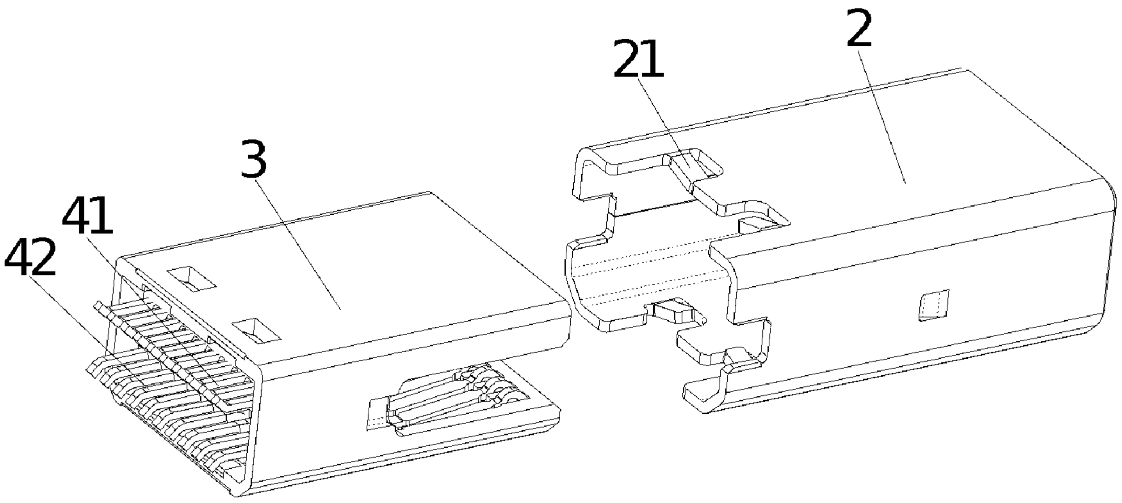
FIG. 2 is a schematic structural diagram of the present disclosure.
Figure 3:
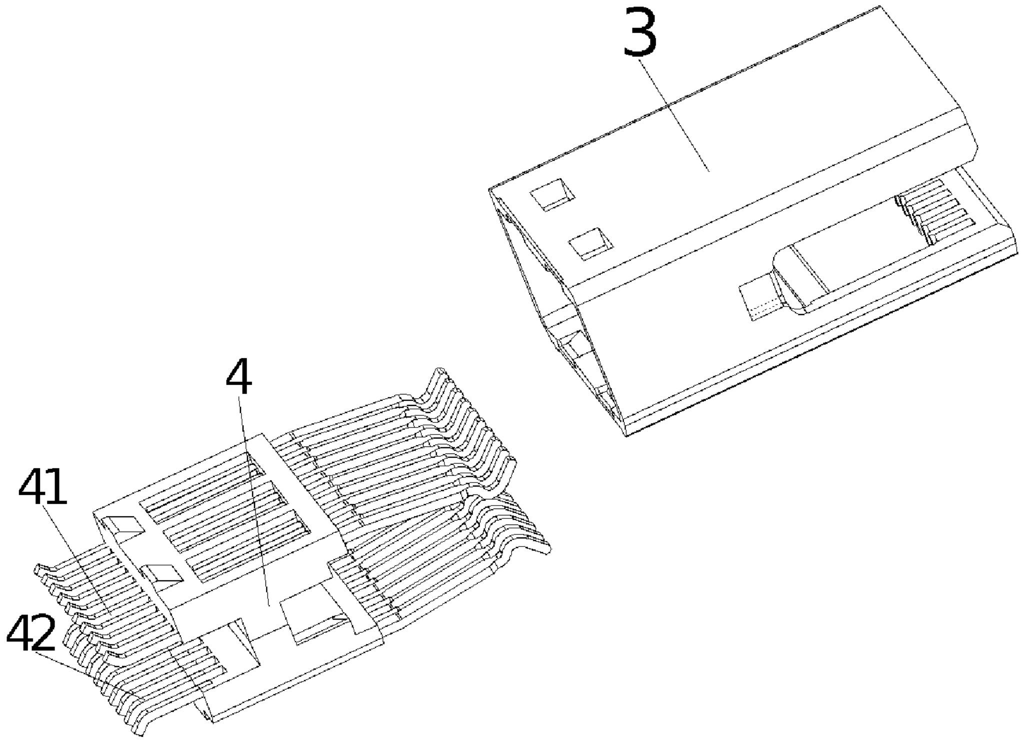
FIG. 3 is a schematic structural diagram of the present disclosure.

1: conductive casing; 11: first stop plate;
2: wire-end casing; 21: second stop plate;
3: wire-end plastic body;
4: terminal set module; 41: upper terminal set module; 42: lower terminal set module; 5: molding piece; 522: stop slot; 521: first groove; 51: terminal plate;
6: printed circuit board (PCB);
7: terminal module; 71: upper terminal set; 711: second groove; 72: partition plate; 721: through hole; 722: grounding arm; 73: lower terminal set; 731: connection pillar;
8: first molding piece.

DETAILED DESCRIPTION

The concept, the specific structure, and the technical effects of the present disclosure will be clearly and completely described in conjunction with the embodiments and the accompanying drawings to fully understand the objectives, features, and effects of the present disclosure. The described embodiments are only a part of the embodiments of the present disclosure, rather than all the embodiments. Based on the embodiments of the present disclosure, other embodiments obtained by those skilled in the art without creative work shall all fall within the scope of protection of the present disclosure. In addition, all the connection/coupling relations involved in the disclosure do not only refer to the direct connection of the components, but rather refer to the fact that a better connection structure can be formed by adding or subtracting connection accessories according to specific implementation conditions. The various technical features in the present disclosure can be combined interactively without a mutual conflict. All figures in the present specification are drawn to scale, the relative size and position of the depicted components should all be regarded as part of the invention but the detailed description is omitted for conciseness.

Referring to FIG. 1 to FIG. 7, one of the possible embodiments of an electrical connector is disclosed, which includes a conductive casing 1; a wire-end casing 2 arranged inside the conductive casing 1; a molding piece 5 arranged inside the conductive casing 1; a printed circuit board (PCB) 6 connected to the bottom side of the molding piece 5; and a terminal module 7 arranged in the molding piece 5.

The terminal module 7 includes an upper terminal set 71, a partition plate 72 and a lower terminal set 73. The partition plate 72 is arranged between the upper terminal set 71 and the lower terminal set 73; grounding arms 722 are arranged at the left and right sides of the partition plate 72 at the front end/protruding end of the partition plate 72; and the grounding arms 722 are capable of contacting or being in touch connection with the wire-end casing 2, without any external connecting piece, when the wire-end casing 2 is plugged into the conductive casing 1, the first stop plates 11 of the conductive casing 1 formed thereon can be connected with the wire-end casing 2, since each of the wire-end casing 2 and the conductive casing 1 is a conductive casing respectively, so that an external grounding path can be formed, such that crosstalk and other noise can be conducted to the GND.

The molding piece 5 is one-piece-formed, and the molding piece 5 has a base portion 52 and a plug portion 51, the plug portion 51 extends forward from the base portion 52. The plug portion 51 has an upper plate 511 and a lower plate 512, wherein the upper plate 511 has an upper groove set 511A, the upper groove set 511A has at least one upper opening facing upward. At least part of the upper terminal set 71 is disposed in the upper groove set 511A and exposed via the upper opening. The lower plate 512 has a lower groove set, the lower groove set has at least one lower opening facing downward (not shown). At least part of the lower terminal set 73 is disposed in the lower groove set and exposed via the lower opening.

Figure 4:
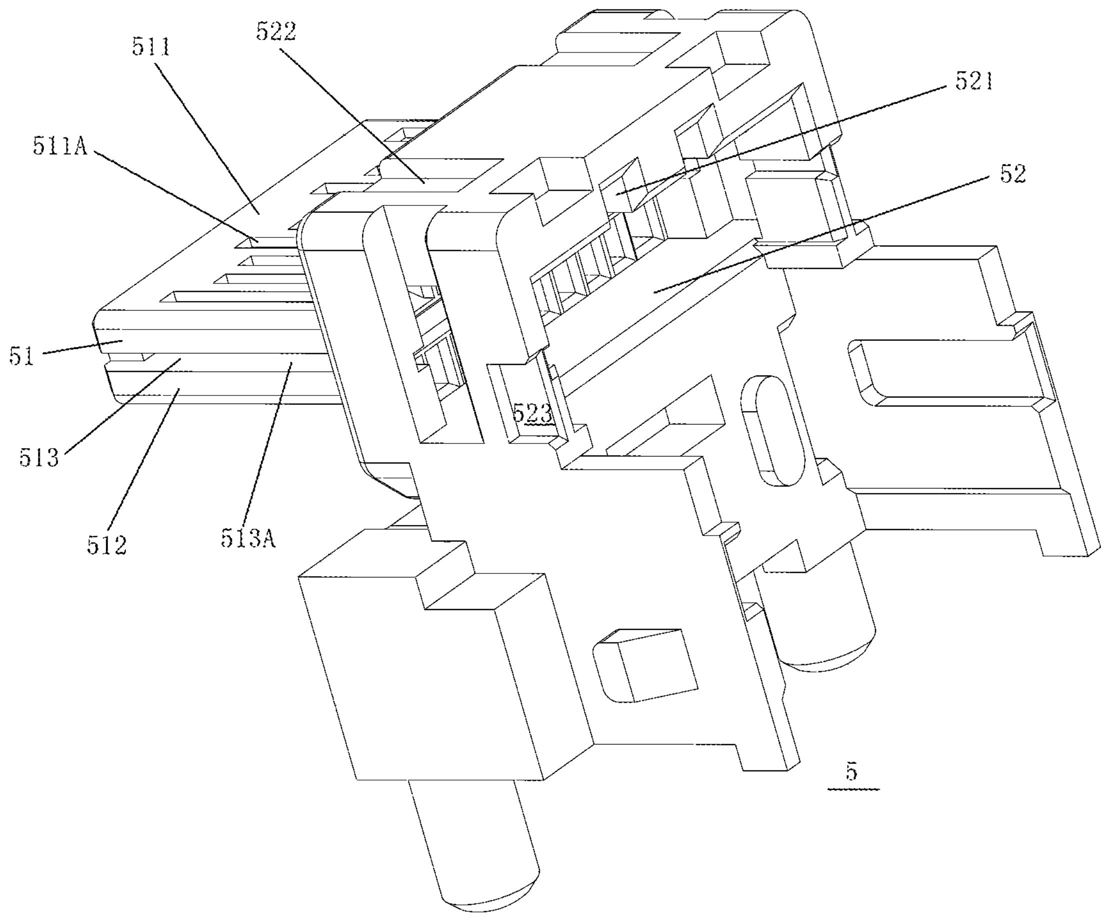
FIG. 4 is a schematic structural diagram of a molding piece of the present disclosure.

As depicted by FIG. 4, a flat-shaped chamber 513 is formed between the upper plate 511 and the lower plate 512, the flat-shaped chamber 513 has two lateral openings 513A. The molding piece 5 further comprises an end wall located at a front end of the plug portion 51 and connecting the upper plate 511 and the lower plate 512 for forming the flat-shaped chamber 513.

Figure 5:
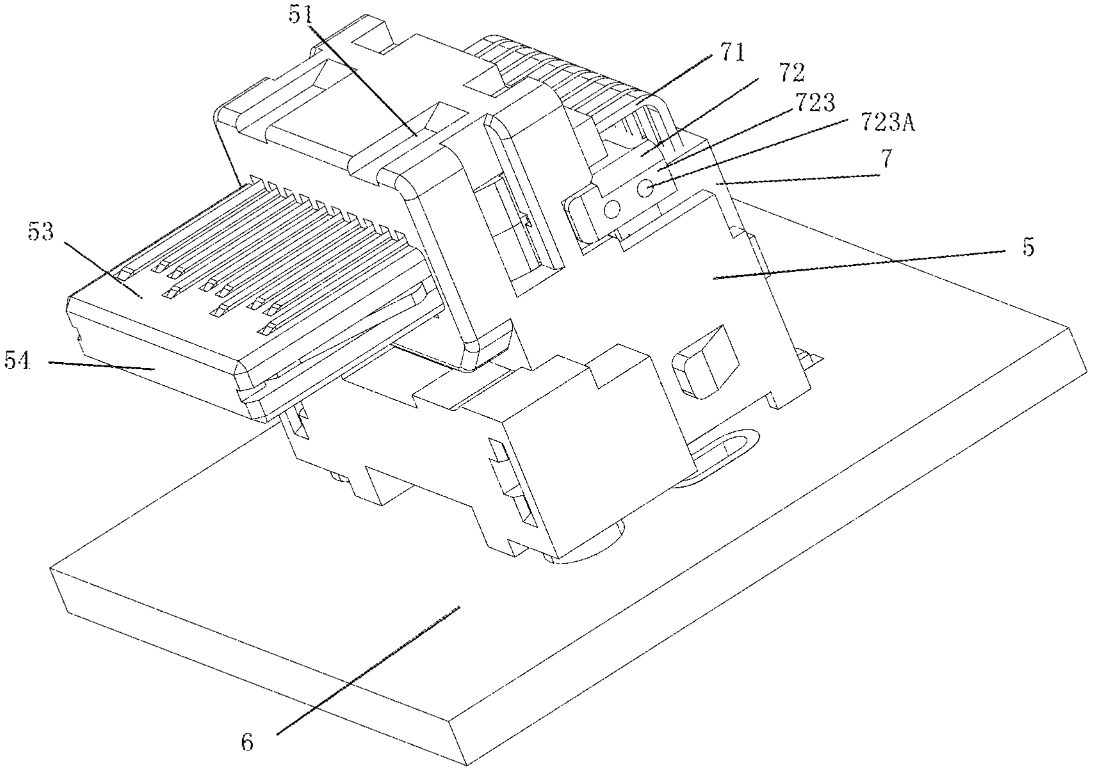
FIG. 5 is a schematic structural diagram of the present disclosure.
Figure 6:
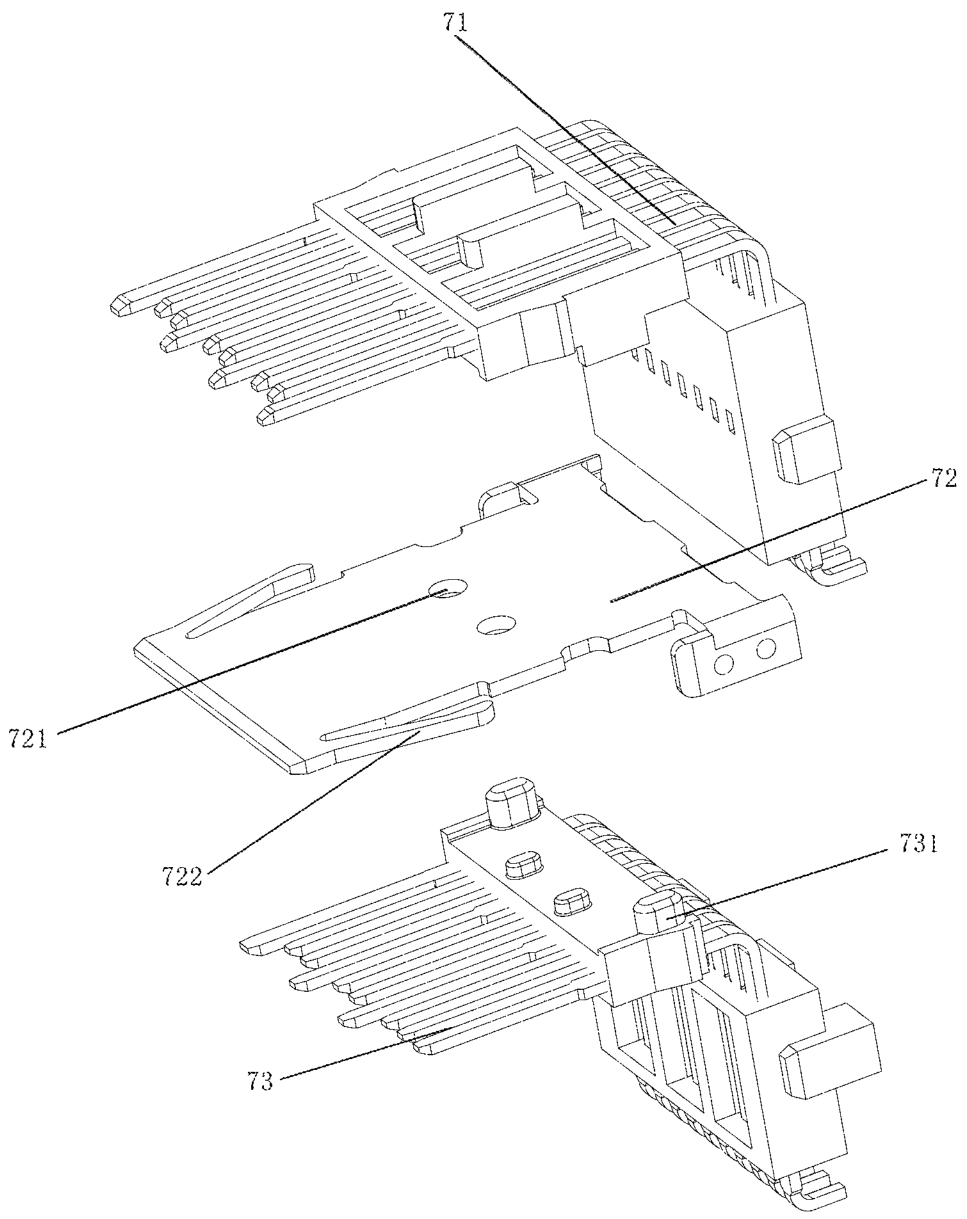
FIG. 6 is a schematic structural diagram of a terminal module of the present disclosure.
Figure 7:
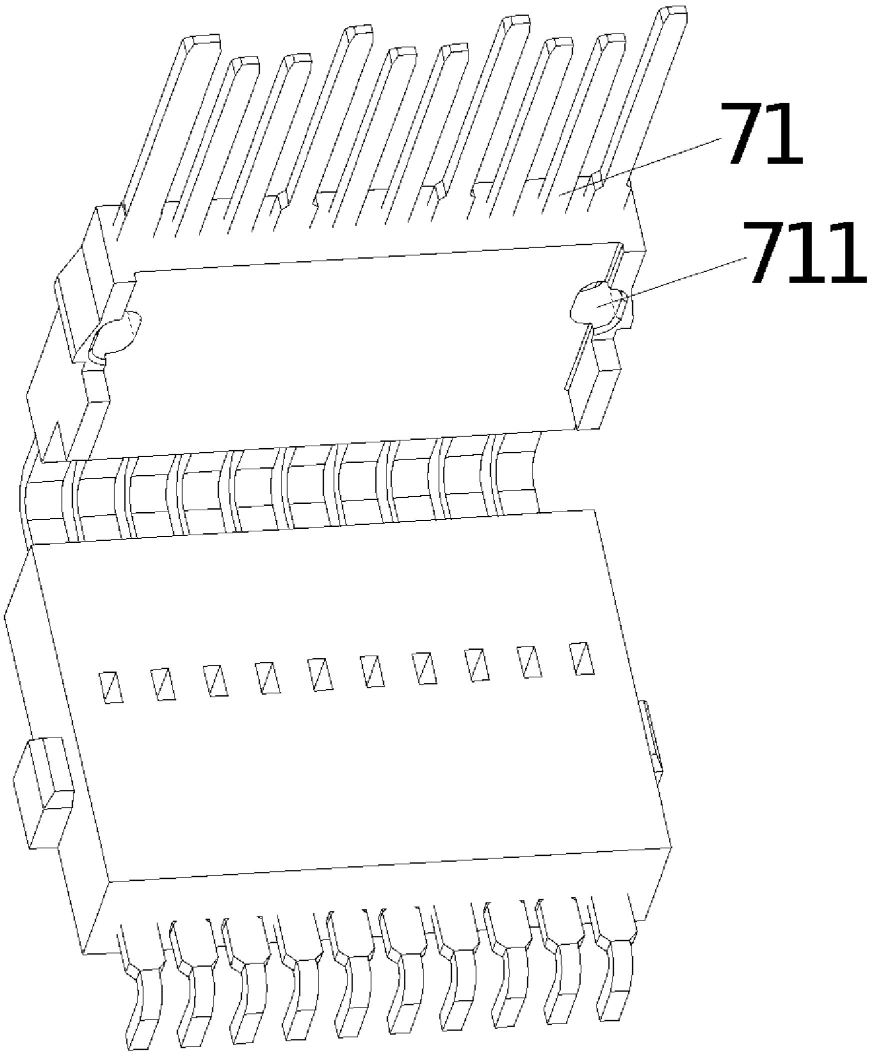
FIG. 7 is a schematic structural diagram of an upper terminal set of the present disclosure. Reference signs in the drawings are described below.

As depicted by FIG. 5, at least part of the conductive partition plate 72 is disposed in the flat-shaped chamber 513 and located between the upper terminal set 71 and the lower terminal set 73, the conductive partition plate 72 is isolated to the upper terminal set 71 and the lower terminal set 73 in the plug portion 51, the conductive partition plate 72 has at least one flexible grounding arm(s) 722 being capable of deforming and protruding out of the flat-shaped chamber 513 via the lateral opening(s) 513A, the flexible grounding arm 722 is capable of connecting with the conductive wire-end casing 2, so as to define an external grounding path, for grounding purpose. A rear end of the conductive partition plate 72 has a hook-shaped portion 723, the hook-shaped portion 723 can optionally has at least one protrusion 723A formed thereon, the protrusion is one-piece formed with the hook-shaped portion 723, for electrically connecting with the conductive casing 1 so as to form an internal grounding path for grounding. Moreover, at least part of the conductive partition plate 72, functioned as a "shield", is located between the front ends of the upper terminal set 71 and the front end of the lower terminal set 73.

As depicted in FIG. 4, a rear side of the base portion 52 of the molding piece 5 has a plurality of terminal entrances, the terminal entrances connect with the upper groove set 511A or the lower groove set for allowing the upper terminal set 71 or lower terminal set 73 to enter the upper groove set 511A or the lower groove set respectively. Both lateral sides of the base portion 52 of the molding piece 5 have a cavity 523 respectively, for allowing the hook-shaped portion of the conductive partition plate 72 to be embedded therein as depicted by FIG. 5, the protrusion 723A is protruding from the cavity 523 for electrically connecting with the conductive casing 1 so as to form an internal grounding path for grounding purpose. The conductive casing 1 may accommodate at least part of the molding piece, the upper terminal set 71, the lower terminal set 73, and the conductive partition plate 72.

Moreover, in the case that the hook-shaped portion 723 has no protrusion 723A formed thereon, the conductive partition plate 72 may be isolated with/not grounded with the conductive casing 1 while the conductive partition plate 72 is not in contact with the wire-end casing 2, or say, while the external grounding path is not yet available.

As depicted in FIG. 1, at the upper right side of the conductive casing, several triangular shaped stoppers/resisting blocks 15 are formed on an inner wall at the top of the conductive casing 1. Moreover, as depicted in FIG. 4, a plurality of stop slots 522 are formed at the top of the molding piece 5; the stop slot 522 is capable of withstanding with the resisting blocks to limit the movement of the molding piece 5. A rear end molding piece 8 is mounted on the back of the conductive casing 1 for covering the molding piece 5 for insulating the conductive casing 1 from electricity.

As depicted in FIG. 4, two first grooves 521 are formed in an inner wall of the molding piece 5; the molding piece 5 is provided with two terminal plates 511,512 longitudinally extending away from the first groove 521; and an end wall 54 is arranged between the two terminal plates 511,512 at the front end thereof to form a chamber 513 for allowing the partition plate 72 to be plugged therein. In detail, when the terminal module 7 is plugged into the molding piece 5, the partition plate 72 of the terminal module 7 is plugged into the chamber 513. This structural arrangement is used for shielding the upper terminal set 71 from the lower terminal set 73 to prevent mutual crosstalk interference in the terminal module 7.

Several second grooves 711 are formed in the upper terminal set 71; several through holes 721 are formed in the partition plate 72; the lower terminal set 73 is fixedly provided with several connection pillars 731 at its top; and the several connection pillars 731 run through the through holes 721 and are plugged into the second grooves 711 to limit the position of the partition plate 72. This structural arrangement shortens the distance from the position where the partition plate 72 contacts the wire-end casing 2 to the terminal module 7.

The conductive casing 1 is fixedly connected with several first stop plates 11 on the outer side; and the several first stop plates 11 extend towards the internal of the conductive casing 1 to contact the wire-end casing 2. This structural arrangement is used for limiting the movement of the wire-end casing 2 so that the wire-end casing 2 is not easy to fall off, and the crosstalk and other noise from the wire-end casing 2 can be transmitted.

A wire-end plastic body 3 is mounted inside the wire-end casing 2; and several second stop plates 21 are provided on the top of the wire-end casing 2 at its protruding end, and the second stop plates 21 extend towards the internal of the wire-end casing 2 to limit the movement of the wire-end plastic body 3. This structural arrangement enables the wire-end plastic body 5 to be stably placed at the desired position itself and prevents undesired sliding.

A terminal set module 4 is arranged inside the wire-end plastic body 3; and the terminal set module 4 includes an upper terminal set module 41 and a lower terminal set module 42. This structural arrangement is used for realizing the functions of the electrical connector.

During use of the present disclosure, firstly, the signal transmission is getting faster and faster, which may easily occur crosstalk interference between the upper terminal set 71 and the lower terminal set 73 of the terminal module 7. At this time, the partition plate 72 is provided between the upper terminal set 71 and the lower terminal set 73, which can prevent the mutual crosstalk interference generated by the upper terminal set 71 and the lower terminal set 73. The grounding arms 722 are arranged on the left and right sides of the partition plate 72, the grounding arms 722 are in touch connection with the wire-end casing 2, and the wire-end casing 2 is in touch connection with the first stop plates 11 arranged on the conductive casing 1, so that the wire-end casing 2 can transmit the crosstalk and other noise to the conductive casing 1, and the conductive casing 1 transmits the crosstalk and other noise to the next structure and to the GND.

The above contents specifically describe preferred implementations of the present disclosure. However, the scope of the present disclosure is not limited to the embodiments. Those skilled in the art can make various equivalent deformations or alterations without departing from the spirit of the present disclosure. These equivalent deformations or alterations shall all fall within the scope defined by the claims of the present disclosure.

The invention claimed is:

1. A board-end electrical connector, comprising:

a molding piece (5), the molding piece being one-piece formed, the molding piece having a base portion (52) and a plug portion (51), the plug portion (51) extending forward from the base portion (52), the plug portion (51) having an upper plate (511) and a lower plate (512), the upper plate (511) having an upper groove set (511A), the upper groove set (511A) having at least one upper opening facing upward, the lower plate (512) having a lower groove set, the lower groove set having at least one lower opening facing downward, a flat-shaped chamber (513) being formed between the upper plate (511) and the lower plate (512), the flat-shaped chamber (513) having two lateral openings (513A);

an upper terminal set (71), at least part of the upper terminal set (71) being disposed in the upper groove set (511A), and being exposed via the upper opening;

a lower terminal set (73), at least part of the lower terminal set (73) being disposed in the lower groove set, and being exposed via the lower opening;

a conductive partition plate (72), at least part of the conductive partition plate (72) being disposed in the flat-shaped chamber (513) and being located between the upper terminal set (71) and the lower terminal set (73), the conductive partition plate (72) being isolated to the upper terminal set (71) and the lower terminal set (73) in the plug portion (51), the conductive partition plate (72) having at least one flexible grounding arm (722) extending from a front edge of the conductive partition plate (72) toward the base portion (52) of the molding piece (5) so as to form a gap facing the base portion (52), the flexible grounding arm (722); the flexible grounding protruding out of the flat-shaped chamber (513) via the lateral opening and being capable of being deformed.

2. The board-end electrical connector according to claim 1, wherein the molding piece (5) further comprising an end wall, the end wall located at a front end of the plug portion (51) and connecting the upper plate (511) and the lower plate (512) for forming the flat-shaped chamber (513).

3. The board-end electrical connector according to claim 2, wherein the base portion (52) of the molding piece (5) has a plurality of terminal entrances, the terminal entrances connect with the upper groove set (511A) or the lower groove set for allowing the upper terminal set (71) or lower terminal set (73) to enter the upper groove set (511A) or the lower groove set.

4. The board-end electrical connector according to claim 3, further comprising a conductive casing (1), the conductive casing (1) accommodating at least part of the molding piece, the upper terminal set (71), the lower terminal set (73), and the conductive partition plate (72), the conductive partition plate (72) being not grounded with the conductive casing.

5. The board-end electrical connector according to claim 3, wherein, a rear end of the conductive partition plate (72)

has a hook-shaped portion (723), the hook-shaped portion (723) having at least one protrusion (723A) formed thereon, the protrusion is one-piece formed with the hook-shaped portion (723), for electrically connecting with the conductive casing (1).

6. The board-end electrical connector according to claim 5, wherein the base portion (52) of the molding piece (5) has a cavity (523) defined by at least a side wall of the base portion, for allowing the hook-shaped portion of the conductive partition plate (72) to be embedded therein, the protrusion (723A) being protruding from the cavity (523) for electrically connecting with the conductive casing (1).

7. The board-end electrical connector according to claim 1, wherein resisting blocks are arranged on an inner wall at the top of the conductive casing (1); stop slots (522) are formed at the top of the molding piece (5); the stop slots (522) are configured to limit the resisting blocks to limit the movement of the molding piece (5); and a first molding piece (8) is mounted on the back of the conductive casing (1) and used for covering at least part of the molding piece (5).

8. The board-end electrical connector according to claim 1, wherein two first grooves (521) are formed in an inner wall of the molding piece (5).

9. The board-end electrical connector according to claim 1, wherein second grooves (711) are formed in the upper terminal set (71); through holes (721) are formed in the partition plate (72); the lower terminal set (73) is fixedly provided with connection pillars (731) at its top; and the connection pillars (731) run through the through holes (721) and are plugged into the second grooves (711) to limit the position of the partition plate (72).

10. The board-end electrical connector according to claim 8, wherein a terminal module (7), which is composed of the upper terminal set (71), the partition plate (72) and the lower terminal set (73), is plugged into the molding piece (5), and wherein the partition plate (72) of the terminal module (7) is plugged into the chamber (513).

11. The board-end electrical connector according to claim 4, wherein the conductive casing (1) is fixedly provided with first stop plates (11) on the outside; and the first stop plates (11) extend towards the internal of the conductive casing (1).

12. A board-end electrical connector, comprising:

an upper terminal set (71);

a lower terminal set (73);

a molding piece (5), the molding piece being one-piece formed, for accommodating the upper terminal set (71) and the lower terminal set (73), the molding piece having a flat-shaped chamber (513) located between the upper terminal set (71) and the second terminal set; and a conductive partition plate (72), disposed in the flat-shaped chamber (513) located between the upper terminal set (71) and the lower terminal set (73), the conductive partition plate (72) being isolated to the upper terminal set (71) and the lower terminal set (73), the partition plate having at least one flexible grounding arm (722); the flexible grounding arm (722) extending from a front edge of the conductive partition plate (72) toward the molding piece (5) so as to form a gap facing the molding piece (5), the flexible grounding arm (722) protruding out of the flat-shaped chamber (513) and being capable of being deformed.

13. The board-end electrical connector according to claim 12, wherein the molding piece has a base portion (52) and a plug portion (51), the plug portion (51) extending forward from the base portion (52), the plug portion (51) having an upper plate (511) and a lower plate (512).

14. The board-end electrical connector according to claim 13, wherein the upper plate (511) has an upper groove set.

15. The board-end electrical connector according to claim 14, wherein the base portion (52) of the molding piece (5) has a cavity (523) for allowing a hook-shaped portion of the conductive partition plate (72) to be embedded therein.

16. The board-end electrical connector according to claim 12, wherein two first grooves (521) are formed in an inner wall of the molding piece (5).

17. The board-end electrical connector according to claim 12, wherein second grooves (711) are formed in the upper terminal set (71), and through holes (721) are formed in the partition plate (72); the lower terminal set (73) is fixedly provided with connection pillars (731) at its top; and the connection pillars (731) run through the through holes (721) and are plugged into the second grooves (711) to limit the position of the partition plate (72).

18. The board-end electrical connector according to claim 12, wherein stop slots (522) are formed at the top of the molding piece (5).

* * * * *